United States Patent [19]

Tsuchiya et al.

[11] Patent Number: 5,350,809
[45] Date of Patent: Sep. 27, 1994

[54] PREPARATION PROCESS OF CHLORINATED RUBBER

[75] Inventors: Hiroshi Tsuchiya; Makoto Kokura, both of Tokyo; Yutaka Ozawa, Kanagawa; Takaaki Sugimura, Tokyo, all of Japan

[73] Assignee: Asahi Denka Kogyo K.K., Tokyo, Japan

[21] Appl. No.: 6,315

[22] Filed: Jan. 22, 1993

[30] Foreign Application Priority Data

Mar. 31, 1992 [JP] Japan .................................. 4-108820

[51] Int. Cl.⁵ .............................................. C08F 8/22
[52] U.S. Cl. ................... 525/356; 525/332.8; 525/332.9; 525/333.1
[58] Field of Search ........................................ 525/356

[56] References Cited

U.S. PATENT DOCUMENTS 2,586,124 2/1952 Van Amerongen .

FOREIGN PATENT DOCUMENTS 4-46905 2/1992 Japan .
277315 8/1951 Switzerland .
634241 3/1950 United Kingdom .

OTHER PUBLICATIONS

K. F. Heinisch "Kautschuk–Lexikon" A. W. Gentner Verlag Stuttgart, 1977, pp. 126–127.
"Rubber Chloride" Encyclopedia of Chemistry, 32th Edition for personal use, Published by Kyoritsu Shuppan K.K., p. 1036 (with English translation).

Primary Examiner—Bernard Lipman
Attorney, Agent, or Firm—Lowe, Price, LeBlanc & Becker

[57] ABSTRACT

Disclosed herein is a process for the preparation of a chlorinated rubber, wherein chlorine gas is caused to act on a polyisoprene rubber to prepare the chlorinated rubber. Chlorine gas is blown into a high-acidity aqueous dispersion of the polyisoprene rubber to chlorinate the polyisoprene rubber, whereby a chlorinated isoprene rubber with high performance is prepared stably in an aqueous medium.

15 Claims, No Drawings

PREPARATION PROCESS OF CHLORINATED RUBBER

FIELD OF THE INVENTION

The present invention relates to a process for the preparation of a chlorinated rubber, and more specifically to a process for stably preparing a chlorinated polyisoprene rubber with high performance in an aqueous medium.

BACKGROUND OF THE INVENTION

Since chlorinated rubbers obtained by chlorinating polyisoprene rubbers such as natural rubber and synthetic polyisoprene are excellent in acid resistance, alkali resistance, chemical resistance, flame resistance, insulating properties, and the like, and have film-forming properties, they are used in varnishes, paints, vehicles for printing inks, films for packaging, adhesives, etc. In particular, highly chlorinated rubbers having a chlorine content (concentration of chlorine) of at least 55 wt. % are widely used as raw materials for anticorrosive paints excellent in drying characteristics.

There has heretofore been known, as processes for chlorinating polyisoprene rubbers, (1) a process in which a polyisoprene rubber is dissolved in a chlorinated hydrocarbon solvent, and chlorine gas is blown into the solution to react them, (2) a process in which a polyisoprene rubber is dispersed or emulsified in water before its chlorination, etc.

The process making use of a chlorinated hydrocarbon such as carbon tetrachloride or monochlorobenzene as a solvent for the chlorination is generally used because it permits even chlorination of polyisoprene rubbers and can give highly chlorinated rubbers soluble in organic solvents. However, the use of the chlorinated hydrocarbons shows a tendency to be limited from the viewpoint of global environmental protection in recent years. Therefore, it has been increasingly desired to develop a chlorination process in an aqueous medium instead.

On the other hand, according to the conventional process in which a polyisoprene rubber is dispersed or emulsified in water before its chlorination, even chlorination is difficult. In addition, rubber particles tend to aggregate in the course of the chlorination, and there is a problem that the resultant chlorinated rubber is hard to be dissolved in a usual solvent such as toluene.

With the foregoing circumstances in view, the present inventors carried out a study of a process for evenly chlorinating a polyisoprene rubber in an aqueous medium without causing aggregation of particles to prepare a highly chlorinated rubber so soluble in organic solvents that it can be used as a raw material for heavy-duty anticorrosive paints. As a result, the present inventors previously proposed a process in which a synthetic rubber or natural rubber is added to an acid aqueous solution to prepare a dispersion of fine particles of the rubber, and the dispersion is then subjected to chlorination to a chlorine concentration of 55-75 wt. % in the presence of a surface active agent (Japanese Patent Application Laid-Open No. 46905/1992).

In this process, the chlorination is conducted by adding a dispersion or emulsion of the synthetic rubber or natural rubber to the acid aqueous solution and blowing chlorine gas into the dispersion or emulsion. The acidity of the aqueous solution is as relatively low as pH of about 1-7. In each of Examples thereof, an aqueous solution containing hydrogen chloride in a concentration of 1-2 wt. % is used. This process has excellent features compared with the conventionally-known process making use of an aqueous medium. However, it involves problems that when the polyisoprene rubber is chlorinated under conditions making use of the acid solution within a pH range of about 1-7, it is difficult to fully prevent the aggregation of particles, the resultant chlorinated rubber has insufficient solubility in organic solvents such as toluene, resulting in the formation of insolubles in some cases, and moreover difficulties are encountered upon sufficiently increasing the solution viscosity of the chlorinated rubber when dissolved in toluene.

OBJECTS AND SUMMARY OF THE INVENTION

It is an object of this invention to provide a process by which a polyisoprene rubber dispersed in an aqueous medium can be evenly chlorinated without causing aggregation of its particles to prepare a chlorinated rubber having high solubility in organic solvents.

The present inventors have carried out an extensive investigation with a view toward solving the above problems. As a result, it has been found that when a polyisoprene rubber is dispersed in an aqueous solution of high acidity, such as an aqueous solution containing hydrogen chloride in a concentration of at least 5 wt. %, preferably at least 10 wt. % which has not been used to date, and chlorine gas is blown into the aqueous dispersion to chlorinate the rubber, high chlorination can be achieved without causing the aggregation of rubber particles, and when a specific surface active agent is added to a natural rubber latex, high chlorination can be achieved at an acid concentration exceeding 2 wt. %, preferably, ranging from 5 to 36 wt. % without causing the aggregation of rubber particles.

Chlorinated rubbers obtained in accordance with this process show good solubility in organic solvents such as toluene, and also can be formed into high-viscosity solutions and show physical properties as good as those of chlorinated rubbers obtained by the conventional chlorination process making use, as a solvent, of a chlorinated hydrocarbon such as carbon tetrachloride.

In view of the fact that it has heretofore been said that a process in which chlorine gas is blown into an acid latex to obtain a chlorinated rubber demands care because the formation of rubber hydrochloride or the cyclization of the rubber occurs if the acidity of the latex is too high (see "rubber chloride" on page 1036 of ENCYCLOPEDIA OF CHEMISTRY, 32th Edition for personal use, published by Kyoritsu Shuppan K.K.), it is surprising that the chlorinated polyisoprene rubber having good physical properties can be obtained in a region high in acid concentration as described above.

The present invention has been led to completion on the basis of these findings.

According to the present invention, there is thus provided a process for the preparation of a chlorinated rubber, wherein chlorine gas is caused to act on a polyisoprene rubber to prepare the chlorinated rubber, which comprises blowing chlorine gas into a high-acidity aqueous dispersion of the polyisoprene rubber to chlorinate the polyisoprene rubber.

DETAILED DESCRIPTION OF THE INVENTION

The polyisoprene rubber used in the present invention is a polymer comprising, as a principal component, isoprene units in its molecule. As specific examples thereof, may be mentioned natural rubber, synthetic polyisoprene, copolymers of isoprene with a monomer having a hydrophilic group such as hydroxyl, carboxyl or amide group, copolymer of isoprene with a vinyl monomer such as a (meth)acrylic ester, copolymers of isoprene with another diene monomer such as butadiene, graft polyisoprenes with maleic acid, maleic anhydride or succinic acid grafted thereon, etc. These rubbers may be used singly or in any combination thereof.

Polyisoprene rubbers other than natural rubber, which are useful in the practice of this invention, preferably have a Mooney viscosity ($ML_{1+4}$, 100° C.) ranging from 20 to 100.. Any Mooney viscosities too low result in a chlorinated rubber small in cohesive force. When such a rubber is used in a paint, the strength of a formed film becomes insufficient. Besides, its use in an adhesive makes it difficult to provide sufficient adhesive force. On the other hand, any natural rubber may be used irrespective of Mooney viscosity. No particular limitation is imposed on the microstructure of the polyisoprene rubber. Therefore, those having any microstructure may be used.

The high-acidity aqueous dispersion of the polyisoprene rubber is generally prepared by mixing an aqueous dispersion of the polyisoprene rubber with an aqueous solution of an acid in a high concentration. The aqueous dispersion of the polyisoprene rubber is obtained by dispersing or emulsifying the polyisoprene rubber in water. In the case of the natural rubber, a latex collected from sap and subjected to a stabilization treatment may be used as it is. In the case of the synthetic rubber, a latex or suspension obtained by a polymerization process in an aqueous medium, such as emulsion polymerization or suspension polymerization may preferably be used from the viewpoint of easiness of operation and cost. Alternatively, those obtained by dissolving the rubber in a solvent, emulsifying or dispersing the solution in water and then conducting desolvation to emulsify the rubber in water may be used.

The average particle size of the polyisoprene rubber in the aqueous dispersion is generally 100 $\mu$m or smaller, preferably 20 $\mu$m or smaller, more preferably 1 $\mu$m or smaller. If the average particle size is too great, difficulties are encountered on even chlorination, so that the resultant chlorinated rubber may have uneven solubility in organic solvents in some cases, resulting in formation of insolubles.

As exemplary acids used in the formation of the aqueous solution of the acid in a high concentration, may be mentioned strong acids such as hydrochloric acid, sulfuric acid and nitric acid. Of these, hydrochloric acid or combined systems of hydrochloric acid with sulfuric acid, nitric acid or the like are preferred from the viewpoint of smooth chlorination.

The concentration of the acid in the aqueous solution of the acid in a high concentration, which is useful in the practice of this invention, is generally at least 5 wt. %, preferably at least 10 wt. %, more preferably at least 15 wt. %. In the case of a 15 wt. % aqueous solution of hydrogen chloride by way of example, the pH thereof is approximately 0. Even when the aqueous dispersion of the polyisoprene rubber in a small proportion is added thereto, the pH is far lower than 1, and at least not higher than 0.5. Therefore, the acid aqueous dispersion prepared by mixing the aqueous dispersion of the polyisoprene rubber with the aqueous solution of the acid in the high concentration becomes a very high acidity. In the case where the latex of natural rubber is used in particular, high chlorination can be achieved without causing the aggregation of rubber particles when the concentration of the acid is controlled so as to be higher than 2 wt. %, preferably not lower than 5 wt. % in the presence of a surface active agent which will be described subsequently. The upper limit of the acid concentration is generally about 40 wt. %, preferably about 36 wt. %.

When the aqueous dispersion of the polyisoprene rubber is mixed with the aqueous solution of the acid in the high concentration, the concentration of the polyisoprene rubber is generally controlled to at least about 1 wt. %, preferably about 1-10 wt. % at the time a chlorination reaction is initiated. In order to control the chlorination reaction, it is preferable to control the concentration of the polymer in the high-acidity aqueous dispersion as low as possible. However, a concentration of 2-10 wt. % is right in view of the balance with productivity. By keeping the concentration of the polymer within this range, the high acid conditions can be maintained stably.

When the aqueous dispersion of the polyisoprene rubber is mixed with the aqueous solution of the acid in the high concentration, it is preferable to cause a surface active agent to exist so as to improve the dispersibility of fine particles of the rubber. However, if the aqueous dispersion of the polyisoprene rubber has already contained a surface active agent, it is not always necessary to add the surface active agent further. If the aqueous dispersion of the polyisoprene rubber is added to the aqueous solution of the acid in the high concentration, the surface active agent may be added into the aqueous solution of the acid in advance.

Preferred surface active agents usable herein may include nonionic surface active agents, anionic surface active agents and mixtures thereof, and nonionic-anionic surface active agents. A nonionic or nonionic-anionic surface active agent is extremely preferred for the natural rubber latex because it can prevent the aggregation of particles in the latex.

As exemplary nonionic surface active agents, may be mentioned polyoxyethylene-polyoxypropylene condensates, polyoxyalkylene alkyl ethers, polyoxyalkylene nonylphenol ethers, sorbitan fatty acid esters, polyoxyalkylene sorbitan fatty acid esters, polyoxyalkylene glycerol fatty acid esters, etc. Of these, those having an HLB (hydrophilic-lipophilic balance) of 8 or greater are preferred.

As exemplary anionic surface active agents, may be mentioned higher alcohol sulfates, alkylbenzene sulfonates, alkyl phosphate salts, polyoxyalkylene sulfates, dialkyl sulfosuccinate salts, etc. However, higher fatty acid soaps and the like, which are liable to be deteriorated by an acid, are not preferred.

Examples of preferred nonionic-anionic surface active agents include sodium polyoxyethylene alkyl ether sulfates, sodium polyoxyethylene alkylaryl ether sulfates, etc.

The proportion of the surface active agent to be used is preferably in the minimum amount sufficient to ensure the stability to dispersion of the high-acidity aqueous dispersion of the polyisoprene rubber, and is generally limited to a range not higher than 15 parts by weight, preferably, of 0.1–10 parts by weight, more preferably, of 1–7 parts by weight, per 100 parts by weight of the polyisoprene rubber. If the proportion of the surface active agent to be used is too high, the chlorination may be adversely affected in some cases.

For example, an acrylic acid polymer, sodium naphthenate, sodium stearate or the like may also be used in combination as an emulsion stabilizer. Other additives such as an anti-foaming agent, which are useful for the stabilization of the chlorination process, may be added suitably.

The mixing of the aqueous dispersion of the polyisoprene rubber with the aqueous solution of the acid in the high concentration is generally conducted either by adding dropwise the aqueous dispersion of the polyisoprene rubber little by little into the aqueous solution of the acid or by spraying it.

The chlorination is carried out by blowing chlorine gas into the high-acidity aqueous dispersion of the polyisoprene rubber. In this case, it is preferable to add dropwise the aqueous dispersion of the polyisoprene rubber into the aqueous solution of the acid while blowing chlorine gas into the aqueous solution.

In order to initiate the chlorination reaction and allow it to proceed, in general, a radical initiator is used, active rays such as ultraviolet rays are irradiated, or both means thereof are used in combination. In generally, the reaction temperature is preferably controlled to a range of 0°–90° C. Any temperatures lower than 0° C. pose problems of freezing of the solvent, and so on. On the contrary, any temperatures higher than 90° C. make particles of the rubber liable to be fusion-bonded to each other. It is preferable that the chlorination reaction is conducted at a low temperature of about 40° C. or lower at an initial stage of the reaction and the temperature is then raised at the subsequent stage. The reaction time is generally about 2–20 hours though it varies depending on the degree of chlorination. The supply of chlorine gas may be conducted either by a gas feed method or by a closed type, and either under atmospheric pressure or under pressure.

The degree of chlorination can be suitably determined as desired. However, the chlorination is generally conducted until the concentration of chlorine (chlorine content) in the resultant chlorinated rubber reaches a range of 55–75 wt. %. If the concentration of chlorine is too low, the resultant chlorine rubber becomes difficult to be dissolved in organic solvents such as toluene. Its compatibility with plasticizers and other resins is also lowered. If the concentration of chlorine is too high on the contrary, the resultant chlorinated rubber becomes difficult to be dissolved in organic solvents.

ADVANTAGES OF THE INVENTION

According to the preparation process of this invention, a polyisoprene rubber can be chlorinated in an aqueous medium making no use of a chlorinated hydrocarbon such as carbon tetrachloride and evenly without causing the aggregation of its particles, and hence a chlorinated rubber having high solubility in organic solvents and high quality can be provided.

The chlorinated rubber provided by the present invention can suitably be used as a raw material for anti-corrosive paints, a vehicle for printing inks, a raw material for adhesives, etc.

EMBODIMENTS OF THE INVENTION

The present invention will hereinafter be described in more specifically by the following Examples, Comparative Example and Preparation Examples. However, it should be borne in mind that this invention is not limited to these examples only. Incidentally, all the designations of "part" or "parts" and "%" which will appear in the following examples mean part or parts by weight and wt. % unless expressly noted.

PREPARATION EXAMPLE 1

Preparation Example of Polyisoprene Latex

A pressure bottle having an internal volume of 1000 ml was charged with 140 parts of soft water, 100 parts of an isoprene monomer, 5 parts of a polyoxyethylene alkylphenyl ether sulfate (nonionic-anionic surface active agent) and 0.3 part of tert-dodecyl mercaptan. After air in the bottle was purged with nitrogen, the bottle was sealed with a crown cap. After a solution with 0.01 part of sodium hydrosulfite dissolved in 5 parts of water was then added thereto, 0.1 part of sodium formaldehyde sulfoxylate, 0.01 part of Frost-Fe (a reducing agent, product of Dai-ich Chemical Industries, Ltd.), 0.01 part of Chelest 400G (chelating agent, product of Chelest Chemical Co., Ltd.) and 0.03 part of sodium pyrophosphate were dissolved in 5 parts of soft water and the resultant solution was added into the bottle.

After the temperature of the reaction system was kept to 5° C., 0.15 part of diisopropylbenzene hydroperoxide was added to initiate a reaction. When the conversion reached 93%, 0.4 part of sodium diethyl dithiocarbamate was added to stop the reaction.

Using an evaporator, an unreacted monomer was then removed under reduced pressure to obtain a latex having a solids concentration of 35%, a viscosity of 75 cps, a pH of 10 and an average particle size of 0.07 μm.

The polyisoprene rubber thus obtained had a Mooney viscosity ($ML_{1+4}$, 100° C.) of 80 and completely dissolved in toluene.

PREPARATION EXAMPLE 2

Preparation Example of Isoprene/methyl Methacrylate Copolymer Latex

A latex was obtained in the same manner as in Preparation Example 1 except that a mixture of 95% of isoprene and 5% of methyl methacrylate was used in place of the isoprene monomer.

This latex had a solids concentration of 35%, a viscosity of 20 cps, a pH of 9 and an average particle size of 0.10 μm. The copolymer rubber thus obtained had a Mooney viscosity ($ML_{1+4}$, 100° C.) of 60 and completely dissolved in toluene.

EXAMPLE 1

A cylindrical reactor having an internal volume of 1 l and equipped with a stirrer, a dropping funnel, a thermometer, a condenser tube and a chlorine gas inlet tube was charged with 550 g of 35 wt. % hydrochloric acid, and the contents were cooled to 10° C. by an ice bath.

While stirring the contents under irradiation by a mercury vapor lamp, chlorine gas was introduced thereinto and at the same time, 57 g of the polyisoprene latex (solids concentration: 35 wt. %) obtained in Preparation Example 1 was added dropwise over 20 minutes while maintaining the temperature of the reaction system to 20° C. or lower. After chlorination was then conducted for 2 hours at a temperature of 10°–20° C., the ice bath was changed for a hot water bath to continue the chlorination for 2 hours at 20°–40° C., and then further for 6 hours at 40°–70° C., whereby 120 g of chlorine gas was introduced. In the course of the chlorination, the dispersing state of particles was extremely good from beginning to end.

After completion of the reaction, nitrogen gas was introduced to purge the remaining chlorine gas, finely particulate chlorinated polyisoprene was separated by filtration. The chlorinated polyisoprene thus separated was washed with water and then dried at 50° C. under reduced pressure.

The chlorine content of the dry chlorinated product (Polymer P-1) in the form of white powder was 69 wt. %. A 20 wt. % solution of the chlorinated product in toluene was colorless and transparent and had a viscosity of 12 cps at 25° C. A film obtained by applying this solution on a glass plate and then drying it was also fully transparent.

EXAMPLE 2

Chlorination was performed under substantially the same conditions as in Example 1 except that 550 g of 25 wt. % hydrochloric acid was used, and a fluorescent lamp was used at the initial stage of a chlorination reaction in place of the mercury vapor lamp.

While stirring the contents under irradiation by the fluorescent lamp, chlorine gas was introduced thereinto and at the same time, 57 g of the polyisoprene latex obtained in Preparation Example 1 was added dropwise over 20 minutes while maintaining the temperature of the reaction system to 20° C. or lower. After chlorination was then conducted for 1 hour at a temperature of 10°–20° C., the fluorescent lamp was changed for a mercury vapor lamp to continue the chlorination for 2 hours at 20°–40° C., and then further for 5 hours at 40°–70° C. The amount of chlorine gas introduced was 100 g. In the course of the chlorination, the dispersing state of particles was extremely good from beginning to end.

After completion of the reaction, a post-treatment was conducted in the same manner as in Example 1, thereby obtaining chlorinated polyisoprene (Polymer P-2) in the form of white powder. The chlorine content of this chlorinated product was 67 wt. %. A 20 wt. % solution of the chlorinated product in toluene was colorless and transparent and had a viscosity of 21 cps at 25° C. A film obtained by applying this solution on a glass plate and then drying it was also fully transparent.

EXAMPLE 3

Chlorination was performed under substantially the same conditions as in Example 1 except that 510 g of 30 wt. % hydrochloric acid and 87 g of the polyisoprene latex obtained in Preparation Example 1 were used.

While stirring the contents under irradiation by a mercury vapor lamp, chlorine gas was introduced thereinto and at the same time, the polyisoprene latex was added dropwise over 30 minutes while maintaining the temperature of the reaction system to 20° C. or lower. Thereafter, chlorination was conducted for 1 hour at a temperature of 10°–20° C., then for 2 hours at 20°–40° C., and further for 6 hours at 40°–80° C., whereby 160 g of chlorine gas was introduced. In the course of the chlorination, the dispersing state of particles was extremely good from beginning to end.

After completion of the reaction, a post-treatment was conducted in the same manner as in Example 1, thereby obtaining chlorinated polyisoprene (Polymer P-3) in the form of white powder, which had a chlorine content of 67 wt. %. A 20 wt. % solution of the chlorinated product in toluene was colorless and transparent and had a viscosity of 25 cps at 25° C. A film obtained by applying this solution on a glass plate and then drying it was also fully transparent.

EXAMPLE 4

Chlorination was performed under substantially the same conditions as in Example 3 except that a fluorescent lamp and a black light fluorescent lamp were used part of the way in a chlorination reaction in place of the mercury vapor lamp.

While stirring the contents under irradiation by the fluorescent lamp, chlorine gas was introduced thereinto and at the same time, the polyisoprene latex was added dropwise over 30 minutes while maintaining the temperature of the reaction system to 10°–20° C. Thereafter, chlorination was conducted for 2 hours at a temperature of 10°–20° C., and then for 2 hours at 20°–40° C. under irradiation by the black light fluorescent lamp. Further chlorination was then carried out for 3 hours at 40°–70° C. under irradiation by a mercury vapor lamp. The amount of chlorine gas introduced was 150 g. In the course of the chlorination, the dispersing state of particles was extremely good from beginning to end.

After completion of the reaction, a post-treatment was conducted in the same manner as in Example 1, thereby obtaining chlorinated polyisoprene (Polymer P-4) in the form of white powder, which had a chlorine content of 65 wt. %. A 20 wt. % solution of the chlorinated product in toluene was colorless and transparent and had a viscosity of 162 cps at 25° C. A film obtained by applying this solution on a glass plate and then drying it was also fully transparent.

EXAMPLE 5

Chlorination was performed under substantially the same conditions as in Example 1 except that 550 g of 20 wt. % hydrochloric acid and 57 g of the isoprene/methyl methacrylate copolymer latex obtained in Preparation Example 2 were used.

While stirring the contents under irradiation by a mercury vapor lamp, chlorine gas was introduced thereinto and at the same time, the copolymer latex was added dropwise over 20 minutes while maintaining the temperature of the reaction system to 20°–30° C. Thereafter, chlorination was conducted for 1 hour at a temperature of 20°–30° C., then for 2 hours at 30°–40° C., and further for 5 hours at 40°–70° C. The amount of chlorine gas introduced was 110 g. In the course of the chlorination, the dispersing state of particles was extremely good from beginning to end.

After completion of the reaction, a post-treatment was conducted in the same manner as in Example 1, thereby obtaining a chlorinated product (Polymer P-5) in the form of pale yellow powder, which had a chlorine content of 70 wt. %. A 20 wt. % solution of the chlorinated product in toluene was pale yellow and transparent and had a viscosity of 13 cps at 25° C. A film obtained by applying this solution on a glass plate and then drying it was also fully transparent.

EXAMPLE 6

To 83 g of a natural rubber latex (solids concentration: 60 wt. %) stabilized by a treatment with ammonia in a low concentration, was added 6 g of a polyoxyethylene alkylphenyl ether sulfate (solids concentration: 25 wt. %) to mix them intimately. The resultant mixture was added dropwise to 1000 g of 25 wt. % hydrochloric acid with stirring to prepare a uniform dispersion.

Thereafter, chlorination was conducted for 4 hours at 10°–30° C. and then further for 8 hours at 40° C. under irradiation by a mercury vapor lamp in substantially the same manner as in Example 1, whereby 250 g of chlorine gas was introduced. In the course of the chlorination, the dispersing state of particles was extremely good from beginning to end.

After completion of the reaction, a post-treatment was conducted in the same manner as in Example 1. The thus-obtained chlorinated product (Polymer P-6) in the form of white powder had a chlorine content of 68 wt. %. A 20 wt. % solution of the chlorinated product in toluene was transparent and had a viscosity of 21 cps at 25° C.

EXAMPLE 7

To 83 g of a natural rubber latex (solids concentration: 60 wt. %) stabilized by a treatment with ammonia in a high concentration, was added 10 g of a polyoxyethylene alkylphenyl ether (solids concentration: 25 wt. %) to mix them intimately. The resultant mixture was added dropwise to 1000 g of 30 wt. % hydrochloric acid with stirring to prepare a uniform dispersion.

Thereafter, chlorination was conducted in the same manner as in Example 6. The thus-obtained chlorinated product (Polymer P-7) in the form of white powder had a chlorine content of 65 wt. %. A 20 wt. % solution of the chlorinated product in toluene was colorless and transparent and had a viscosity of 15 cps at 25° C.

EXAMPLE 8

To 83 g of the same natural rubber latex as that used in Example 7, was added 8 g of a sodium polyoxyethylene alkyl ether sulfate (solids concentration: 30 wt. %) to mix them intimately. The resultant mixture was added dropwise to 1000 g of 10 wt. % hydrochloric acid with stirring to prepare a uniform dispersion.

Thereafter, chlorination was conducted in the same manner as in Example 6. The thus-obtained chlorinated product (Polymer P-8) in the form of white powder had a chlorine content of 66 wt. %. A 20 wt. % solution of the chlorinated product in toluene was colorless and transparent and had a viscosity of 12 cps at 25° C.

EXAMPLE 9

To 83 g of the same natural rubber latex as that used in Example 7, were added 2 g of a dialkyl sulfosuccinate salt (solids concentration: 80 wt. %) and 5 g of a polyoxyethylene alkylphenyl ether (solids concentration: 25 wt. %) to mix them intimately. The resultant mixture was added dropwise to 1000 g of 5 wt. % hydrochloric acid with stirring to prepare a uniform dispersion.

Thereafter, chlorination was conducted in the same manner as in Example 6. The thus-obtained chlorinated product (Polymer P-9) in the form of white powder had a chlorine content of 64 wt. %. A 20 wt. % solution of the chlorinated product in toluene was transparent and had a viscosity of 29 cps at 25° C.

COMPARATIVE EXAMPLE 1

Chlorination was performed in the same manner as in Example 1 except that 550 g of purified water was used in place of 550 g of 35 wt. % hydrochloric acid.

While stirring the contents under irradiation by a mercury vapor lamp, chlorine gas was introduced thereinto and at the same time, 57 g of the polyisoprene latex obtained in Preparation Example 1 was added dropwise over 20 minutes while maintaining the temperature of the reaction system to 10°–20° C. The aggregation of particles in the latex was observed right after the dropping, and a lump of the particles was somewhat formed at the end of the dropping. Thereafter, chlorination was continued for 2 hours at 10°–20° C., whereby 63 g of chlorine gas was introduced. However, a lump was formed greatly, so that it was difficult to stir the latex, and hence chlorination became failed to continue.

The reaction was discontinued, and a post-treatment was conducted in the same manner as in Example 1, thereby obtaining a chlorinated product in which a small amount of powder and a great amount of a lump coexisted. This chlorinated product had a chlorine content of 42 wt. % and scarcely dissolved in toluene.

Preparation of Paints and Evaluation of Physical Properties

Using the chlorinated polyisoprenes obtained in Examples 1–4 and 6–9 according to this invention, and the chlorinated isoprene/methyl methacrylate copolymer obtained in Example 5 according to this invention, and for the sake of comparison, two kinds of chlorinated rubbers, which had been prepared by chlorinating natural rubber in accordance with the process making use of carbon tetrachloride as a solvent, i.e., (1) Adeca Chlorinated Rubber CR-10, chlorine content: 65 wt. %, viscosity of 20 wt. % toluene solution: 11 cps at 25° C.; and (2) Adeca Chlorinated Rubber CR-20, chlorine content: 65 wt. %, viscosity of 20 wt. % toluene solution: 20 cps at 25° C., paints were prepared in accordance with the following formulation, and each of the resultant paints was applied on a mild steel sheet under the following coating and drying conditions to evaluate the physical properties of the formed coating film. The results are shown in Table 1.

| <Formulation of paint> | |
|---|---|
| Polymer | 20.3% |
| Toyoparax #150 | 8.7% |
| JR-500 (TiO$_2$) | 21.0% |
| Xylene | 50.0% |

Note:
Toyoparax #150 is a 70% chlorinated paraffin produced by Toyo Kasei Co., Ltd.

Coating and Drying Conditions (1) SPCC-SB (JIS G-3141), mild steel sheet (0.6×50×150 mm; #280 abrasion), was used.
(2) Washing of steel sheet: washed with chloroform and then with toluene.
(3) Coating: Bar Coater 050 (0.50 mm).
(4) Drying: set for 48 hours at room temperature and then dried for 3 hours at 60° C.

TABLE 1

| Test item | P1 | P2 | P3 | P1/P4 (60/40 parts) | P5 | CR-10 | CR-20 | P6 | P7 | P8 | P9 |
|---|---|---|---|---|---|---|---|---|---|---|---|
| Primary physical properties | | | | | | | | | | | |
| Pigment dispersibility | ◎ | ◎ | ◎ | ◎ | ◎ | ◎ | ◎ | ◎ | ◎ | ◎ | ◎ |
| Thickness of film (μm) | 26 | 32 | 33 | 41 | 27 | 26 | 32 | 32 | 32 | 24 | 34 |
| Gloss (60° mirror reflectivity, %) | 87.8 | 87.8 | 87.2 | 86.9 | 87.0 | 83.8 | 87.8 | 87.5 | 89.2 | 87.2 | 80.3 |
| Hardness (pencil hardness; Mitsubishi Uni) | 2H | 2H | 2H | 2H | 2H | 2H | 2H | 2H | 2H | 2H | 2H |
| Cross-cut adhesion (1 mm/mm; /100 tape peeling) | 100 | 100 | 100 | 100 | 100 | 100 | 100 | 100 | 100 | 100 | 100 |
| Drawing (load: 500 g × /10) | 10 | 10 | 10 | 10 | 10 | 10 | 10 | 10 | 10 | 10 | 10 |
| Flex (φ: 3 mm, <180°) | ○ | ○ | ○ | ○ | ○ | ○ | ○ | ○ | ○ | ○ | ○ |
| Erichsen (φ: 3 mm, 8 mm) | ○ | ○ | ○ | ○ | ○ | ○ | ○ | ○ | ○ | ○ | ○ |
| Impact (φ: ½ in, 500 g × 50 cm) | ○-◎ | ○-◎ | ○-◎ | ○-◎ | ○-◎ | ○-◎ | ○-◎ | ◎ | ◎ | ◎ | ◎ |
| Secondary physical properties | | | | | | | | | | | |
| Light fastness; (200 hr) ΔE (germicidal lamp) | 2.96 | 3.05 | 3.10 | 2.82 | 3.25 | 2.94 | 3.32 | 2.98 | 2.88 | 3.05 | 2.85 |
| Gloss retention (%) | 72.1 | 73.3 | 74.2 | 75.2 | 70.4 | 67.8 | 72.8 | 73.1 | 73.5 | 72.5 | 71.2 |
| Salt spray; surface condition | Normal | Normal | Normal | Normal | Normal | Normal | Normal | Normal | Normal | Normal | Normal |
| (300 hr) Rusting in base metal surface | None | None | None | None | None | None | None | None | None | None | None |
| Weather resistance; (Uvcon) surface | ◎ | ◎ | ◎ | ◎ | ◎ | ◎ | ◎ | ◎ | ◎ | ◎ | ◎ |
| (200 hr) Gloss retention (%) | 99.4 | 97.1 | 98.9 | 99.9 | 98.1 | 102.3 | 98.0 | 96.0 | 97.2 | 95.0 | 94.5 |

CR-10, CR-20: Both commercially-available chlorinated rubbers.

Note:
(1) Evaluation method and standard of pigment dispersibility:
Evaluation method:
After the preparation of each paint, it was applied thinly on a glass plate to visually observe whether abnormalities such as a granular structure occurred.
Evaluation standard:
◎: The coating film was even.
(2) Evaluation method and standard of flexing properties:
Evaluation method:
Followed the flex test of JIS K-5400 (φ: 3 mm, bending through 180°).
Evaluation standard:
○: No abnormalities such as peeling or crazing occurred.
(3) Evaluation method and standard of Erichsen:
Evaluation method:
Followed the Erichsen testing method (φ : 3 mm, indenting depth: 8 mm).
Evaluation standard:
○: No abnormalities such as peeling or crazing occurred.
(4) Evaluation method and standard of impact strength:
Evaluation method:
Followed the Du Pont impact testing method (φ: ½ inch, weight: 500 g, height: 50 cm).
Evaluation standard:
◎: No peeling of the coating film occurred.
○: Crazing slightly occurred on corner portions.
(5) Evaluation method and standard of weather resistance:
Evaluation method:
Irradiated for 200 hours by a Uvcon ASTM-G53 type manufactured by Toyo Seiki Seisaku-Sho, Ltd (humidity: 60%, temperature: 40° C., UV wavelength: 280–350 nm, UV-wetting cycle time: 15 hours).
Evaluation standard:
◎: No abnormalities occurred on the coating film on the surface.

It is understood from the results of Table 1 that the chlorinated products obtained in accordance with the preparation process of this invention have film properties as good as those of the chlorinated rubbers prepared in accordance with the conventional process making use of carbon tetrachloride as a solvent.

We claim:

1. A process for the preparation of a chlorinated rubber wherein chlorine gas is reacted with a polyisoprene rubber to form a chlorinated rubber, the improvement comprising:
preparing an aqueous dispersion of said polyisoprene rubber;
preparing an aqueous acid solution having a high concentration of acid;
adding said aqueous dispersion of polyisoprene rubber dropwise into said aqueous acid solution while blowing chlorine gas into the said aqueous acid solution, thereby chlorinating said polyisoprene rubber and forming a chlorinated rubber product.

2. The process as claimed in claim 1, wherein the polyisoprene rubber is natural rubber or a synthetic polyisoprene rubber having a Mooney viscosity ($ML_{1+4}$, 100° C.) of 20–100.

3. The process as claimed in claim 1, wherein the acid is hydrochloric acid, sulfuric acid, nitric acid or a mixture of at least two acids thereof.

4. The process as claimed in claim 1, wherein the aqueous solution of the acid in the high concentration is an aqueous solution having an acid concentration higher than 2 wt. % but not higher than 40 wt. %.

5. The process as claimed in claim 1, wherein the aqueous solution of the acid in the high concentration is an aqueous solution having an acid concentration of 5–36 wt. %.

6. The process as claimed in claim 1, wherein an aqueous dispersion composed of a natural rubber latex with the surface active agent added thereto is added dropwise into the aqueous solution of the acid in the high concentration, said aqueous solution having an acid concentration higher than 2 wt. % but not higher than 36 wt. %.

7. The process as claimed in claim 6, wherein the surface active agent is a nonionic or nonionic-anionic surface active agent.

8. The process as claimed in claim 1, wherein an average particle size of the polyisoprene rubber in the aqueous dispersion is 100 μm or smaller.

9. The process as claimed in claim 1, which comprises initiating a chlorination reaction by using a radical initiator, irradiating active rays, or combining both means thereof, and conducting chlorination under conditions of a reaction temperature of 0°–90° C. and a reaction time of 2–20 hours.

10. The process as claimed in claim 1, which comprises conducting chlorination until the concentration of chlorine in the resultant chlorinated rubber reaches 55–75 wt. %.

11. A process for the preparation of a chlorinated rubber wherein chlorine gas is reacted with a polyisoprene rubber to form a chlorinated rubber, the improvement comprising:

preparing an aqueous dispersion of said polyisoprene rubber;

preparing an aqueous acid solution having an acid concentration between about 2 wt. % and 40 wt. %;

dropwise adding or spraying said aqueous dispersion of polyisoprene rubber into said aqueous acid solution while blowing chlorine gas into said aqueous acid solution, thereby chlorinating said polyisoprene rubber and forming a chlorinated rubber product.

12. The process as claimed in claim 11 wherein an average particle size of said polyisoprene rubber in the aqueous dispersion is 100 μm or smaller.

13. The process as claimed in claim 11 wherein the chlorination is initiated by using a radical initiator, irradiating active rays, or combining both means thereof, and conducting chlorination under conditions of a reaction temperature of 0°–90° C. and a reaction time of 2–20 hours.

14. A process for the preparation of a chlorinated rubber wherein chlorine gas is reacted with a polyisoprene rubber to form a chlorinated rubber, the improvement comprising:

preparing an aqueous dispersion of said polyisoprene rubber;

preparing an aqueous acid solution having an acid concentration between about 2 wt. % and 40 wt. %;

adding said aqueous dispersion of polyisoprene rubber into said aqueous acid solution in a manner such that no aggregation of the polyisoprene rubber particles occurs and wherein the average particle size of said polyisoprene rubber in the aqueous dispersion is 100μm or smaller, while blowing chlorine gas into said aqueous acid solution, thereby chlorinating said polyisoprene rubber and forming a chlorinated rubber product.

15. The process as claimed in claim 14 which comprises conducting chlorination until the concentration of chlorine in the resultant chlorinated rubber reaches 55–75 wt. %.

* * * * *